(No Model.)

E. L. BABCOCK.
PULLEY.

No. 313,467. Patented Mar. 10, 1885.

Attest—
Geo. F. Robinson
Luther Day,

Inventor
Erskine L. Babcock.
By Bradford Howland
Attorney

UNITED STATES PATENT OFFICE.

ERSKINE L. BABCOCK, OF CUYAHOGA FALLS, OHIO, ASSIGNOR TO THE FALLS RIVET COMPANY, OF SAME PLACE.

PULLEY.

SPECIFICATION forming part of Letters Patent No. 313,467, dated March 10, 1885.

Application filed September 27, 1884. (No model.)

*To all whom it may concern:*

Be it known that I, ERSKINE L. BABCOCK, a citizen of the United States, residing at Cuyahoga Falls, in the county of Summit and State of Ohio, have invented a new and useful Improvement in Pulleys, of which the following is a specification.

My invention relates to the class of pulleys with a hub, spokes, and inner rim of cast metal, and an outer rim of sheet or rolled metal.

Figure 1:
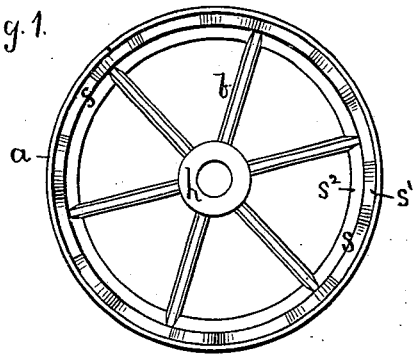
Figure 2:
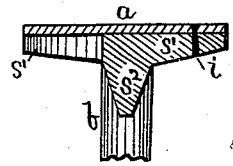
Figure 3:
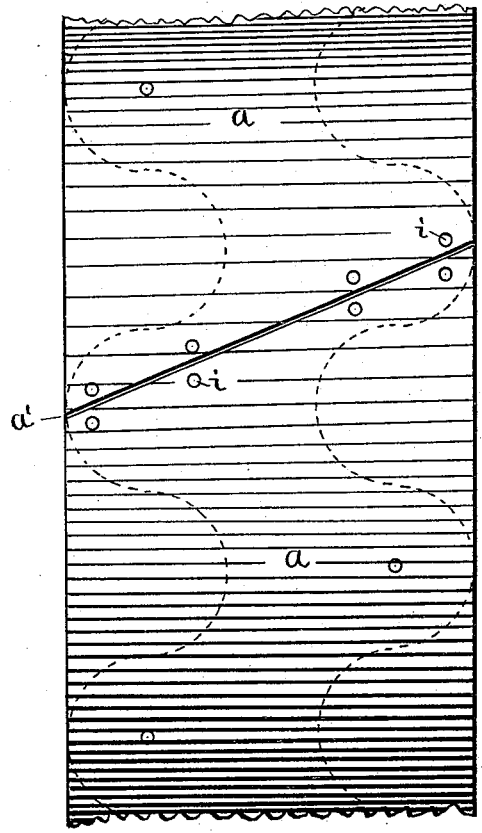
Figure 4:
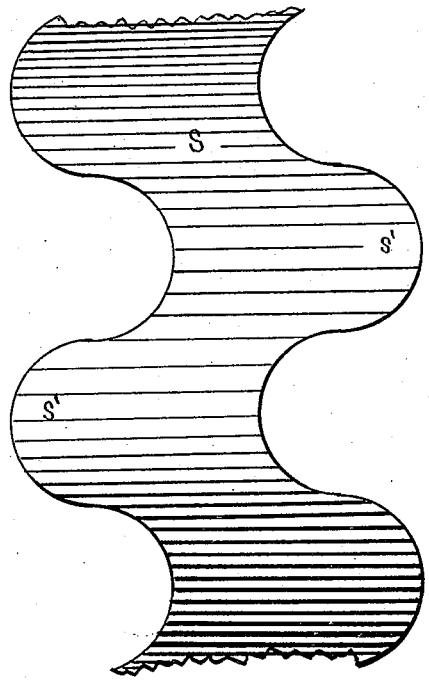

In the drawings forming a part of this specification, Figure 1 is a side view of the pulley. Fig. 2 is a sectional view of the two rims. Fig. 3 is an enlarged view of the face of a part of the pulley, showing the joint of the outer rim, and indicating by dotted lines the outlines of the alternate lugs on the sides of the inner rim; and Fig. 4 is an enlarged view of the same, with the outer rim removed.

The hub $h$, spokes $b$, and inner rim, $s$, are cast in one piece. The outer rim, $a$, is made of rolled or sheet metal, preferably, and attached by rivets $o$ or screws to the inner rim, $s$. This inner rim is formed with lateral lugs $s'$ in alternate order on opposite sides of the rim, and also with a circumferential flange, $s^2$, projecting toward the axis of the pulley for the purpose of strengthening the latter. The lugs $s'$ are curved, and larger at their junction with the rim than at their outer part, and the front of each lug on one side extends beyond the rear of the next lug on the other side. By reason of the lugs being thus wider at their base than the distance between them a lighter rim $s$ may be used than if the lugs were narrower. By thus forming rim $s$ with lateral lugs $s'$ in alternate order on the opposite sides with the space between the lugs at their junction with the rim $s$ less than the width of the lug, the rim of the pulley can be made much lighter in weight than with the lugs directly opposite each other, and at the same time it is thereby protected against lateral strain. The joint $a'$ of rim $a$ extends diagonally across the rim over two lugs, $s'$, on opposite sides of rim $s$, and the ends of rim $a$ are fastened by rivets $i$ to these two lugs.

By reason of the joint extending diagonally across the face of the pulley, the latter has greater strength at that part than if the joint extended directly across the pulley.

The part of the pulley composed of the hub $h$, spokes $b$, and rim $s$ may, if preferred, be cast in two parts and bolted together.

I claim as my invention—

1. The hub $h$, spokes $b$, and rim $s$, formed with lugs $s'$ in alternate order on opposite sides of the rim, narrower at their outer ends than at their base, where they are wider than the space between them, in combination with the outer rim, $a$, substantially as described.

2. The hub $h$, spokes $b$, and rim $s$, formed with lugs $s'$ in alternate order on opposite sides of the rim, narrower at their outer ends than at their base, where they are wider than the space between them, and with an inner circumferential flange, $s^2$, in combination with the outer rim, $a$, substantially as described.

3. The outer rim, $a$, formed with the diagonal joint $a'$, in combination with hub $h$, spokes $b$, and rim $s$, formed with lugs $s'$ on opposite sides of rim $s$, substantially as described.

ERSKINE L. BABCOCK.

Witnesses:
SAML. HIGGS,
ARTHUR HIGGS.